(12) United States Patent
Jang et al.

(10) Patent No.: US 8,283,900 B2
(45) Date of Patent: Oct. 9, 2012

(54) METHODS AND SYSTEMS FOR CONTROLLING BOOST CONVERTERS

(75) Inventors: Seok-Joo Jang, Irvine, CA (US); Ray M. Ransom, Big Bear City, CA (US)

(73) Assignee: GM Global Technologies Operations LLC, Detroit, MI (US)

( * ) Notice: Subject to any disclaimer, the term of this patent is extended or adjusted under 35 U.S.C. 154(b) by 312 days.

(21) Appl. No.: 12/615,888

(22) Filed: Nov. 10, 2009

(65) Prior Publication Data

US 2011/0109292 A1    May 12, 2011

(51) Int. Cl.
*G05F 1/613* (2006.01)
*H02M 3/139* (2006.01)
(52) U.S. Cl. ......... 323/222; 323/283; 323/285; 323/299
(58) Field of Classification Search .................. 323/222, 323/223, 282, 283, 285, 299; 363/89
See application file for complete search history.

(56) References Cited

U.S. PATENT DOCUMENTS

| 7,405,526 B2 * | 7/2008 | Sato ............................. 318/139 |
| 2004/0257842 A1 * | 12/2004 | Hui et al. ........................ 363/97 |
| 2006/0250120 A1 * | 11/2006 | King ............................. 323/283 |
| 2007/0247121 A1 * | 10/2007 | Wu et al. ....................... 323/222 |
| 2008/0030182 A1 * | 2/2008 | Sutardja et al. ............... 323/283 |

* cited by examiner

*Primary Examiner* — Adolf Berhane
*Assistant Examiner* — Fred E Finch, III
(74) *Attorney, Agent, or Firm* — Ingrassia Fisher & Lorenz, P.C.

(57) ABSTRACT

A method for controlling a boost converter having a duty cycle includes the steps of receiving an electric current command for the boost converter, measuring a source current for the boost converter, regulating the duty cycle as a function of the electric current command and the source current, subject to a first minimum limit if a rapid change in duty cycle is required above a predetermined threshold and a second minimum limit if the rapid change in duty cycle is not required.

16 Claims, 3 Drawing Sheets

METHODS AND SYSTEMS FOR CONTROLLING BOOST CONVERTERS

TECHNICAL FIELD

The present invention generally relates to the field of electric systems and, more specifically, to methods and systems for controlling boost converters of electric systems.

BACKGROUND

A boost converter in an electric circuit increases the direct current (DC) voltage of the electric current. Specifically, the output DC voltage of the boost converter is greater than the input DC voltage of the boost converter. Boost converters typically include one or more inductors that resist changes in current. The boost converter absorbs energy while it is charged and discharges supplies energy while it is discharged. The voltage produced by the boost converter during the discharge phase is related to the rate of change of current, and not to the original charging voltage, thereby resulting in an output voltage that is greater than the input voltage.

Controllers may be used to control boost converters in response to electric current commands. For example, if an electric current command is greater than an existing source current, a controller may increase a duty cycle of a transistor of the boost converter, to thereby gradually increase the DC voltage in accordance with the electric current command. However, in certain instances, such adjustment in the DC voltage may take longer than desired.

Accordingly, it is desirable to provide an improved method for controlling a boost converter, for example to provide faster and/or improved adjustments of the DC voltage. It is also desirable to provide an improved control system for a boost converter, for example to provide faster and/or improved adjustments of the DC voltage. Furthermore, other desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment of the present invention, a method for controlling a boost converter having a duty cycle is provided. The method comprises the steps of receiving an electric current command for the boost converter, measuring a source current for the boost converter, regulating the duty cycle as a function of the electric current command and the source current, subject to a first minimum limit if a rapid change in duty cycle is required above a predetermined threshold and a second minimum limit if the rapid change in duty cycle is not required.

In accordance with another further exemplary embodiment, a method for controlling a boost converter having a duty cycle is provided. The method comprises the steps of receiving an electric current command for the boost converter, measuring a source current for the boost converter, determining a boost ratio for the boost converter, determining an existing value of the duty cycle, regulating the duty cycle as a function of the electric current command, the source current, and the boost ratio if the existing value of the duty cycle is greater than or equal to a first predetermined value, a difference between the electric current command and the source current is less than a second predetermined value, or both, forcing the duty cycle to a first fixed value if the existing value of the duty cycle is greater than or equal to a first predetermined value, the difference between the electric current command and the source current is less than the second predetermined value, or both, and forcing the duty cycle to a second fixed value if the existing value of the duty cycle is less than the first predetermined value, the difference between the electric current command and the source current is greater than or equal to the second predetermined value, and the source current is greater than or equal to the electric current command, the second fixed value being equal to the existing value of the duty cycle minus the constant.

In accordance with a further exemplary embodiment, a system for controlling a boost converter having a duty cycle is provided. The system comprises a sensor and a processor. The sensor is configured to measure a source current of the boost converter. The processor is coupled to the sensor, and is configured to receive an electric current command and regulate the duty cycle as a function of the electric current command and the source current, subject to a first minimum limit if a rapid change in duty cycle is required above a predetermined threshold and a second minimum limit if the rapid change in duty cycle is not required.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
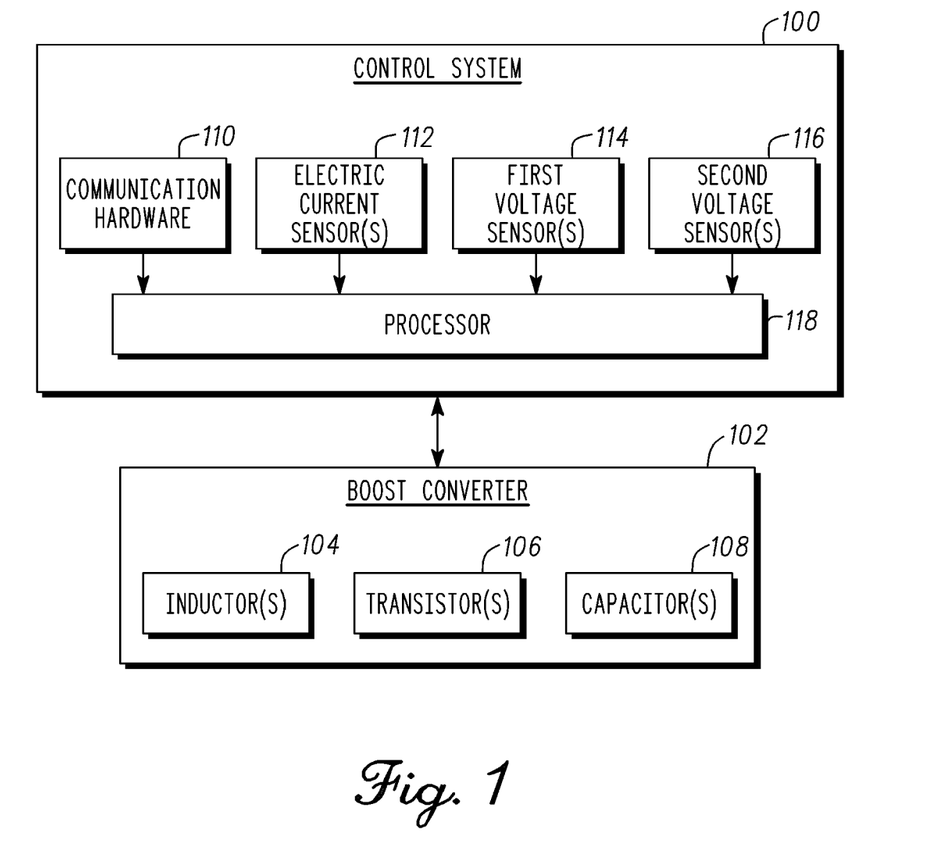
FIG. 1 is a functional block diagram of a control system for controlling a boost converter of an electric system, and depicted alongside an exemplary boost converter, in accordance with an exemplary embodiment.

FIG. 1 is a functional block diagram of a control system 100 for a boost converter 102 of an electric system. As depicted in FIG. 1, the boost converter 102 includes one or more inductors 104, transistors 106, and capacitors 108. In one preferred embodiment, the boost converter 102 comprises a two-phase boost converter with a coupled inductor 104. However, it will be appreciated that the type of boost converter 102 may vary in other embodiments. For example, in various embodiments, the boost converter 102 may have a different number of phases or inductors 104, among other possible variations to the boost converter 102. Also in one preferred embodiment, the control system 100 and boost converter 102 are configured to be used in an electric system of a vehicle, such as an automobile. However, this may also vary in other embodiments.

In the depicted embodiment, the control system 100 includes communication hardware 110, one or more electric current sensors 112, one or more first voltage sensors 114, and one or more second voltage sensors 116. The communication hardware 110 is coupled to the processor 118. In a preferred embodiment, the communication hardware 110 is coupled between a command source (not depicted in FIG. 1) and the processor 118. The communication hardware 110 provides an electric current command from the command source to the processor 118, preferably in accordance with the steps of the process 200 set forth in FIG. 2 and described further below in connection therewith. The command source may comprise, by way of example only, a human being, another control system, and/or another device and/or system. In one exemplary embodiment, the communication hardware 110 comprises a serial communications bus. However, various other different types of communication hardware 110 may also be utilized in various exemplary embodiments.

The electric current sensors 112 are coupled between the inductors 104 and the processor 118. The electric current sensors 112 measure an electric source current of the inductors 104 (and thereby of the boost converter 102), and supplies the measure to the processor 118 for processing, preferably also in accordance with the steps of the process 200 set forth in FIG. 2 and described further below in connection therewith.

The first voltage sensors 114 are coupled between the capacitors 108 and the processor 118. The first voltage sensors 114 measure an input direct current (DC) voltage of the capacitors 108 (and thereby of the boost converter 102), and supply the measure to the processor 118 for processing, preferably also in accordance with the steps of the process 200 set forth in FIG. 2 and described further below in connection therewith.

The second voltage sensors 116 are also coupled between the capacitors 108 and the processor 118. The second voltage sensors 114 measure an output direct current (DC) voltage of the capacitors 108 (and thereby of the boost converter 102), and supply the measure to the processor 118 for processing, preferably also in accordance with the steps of the process 200 set forth in FIG. 2 and described further below in connection therewith.

Figure 2A:
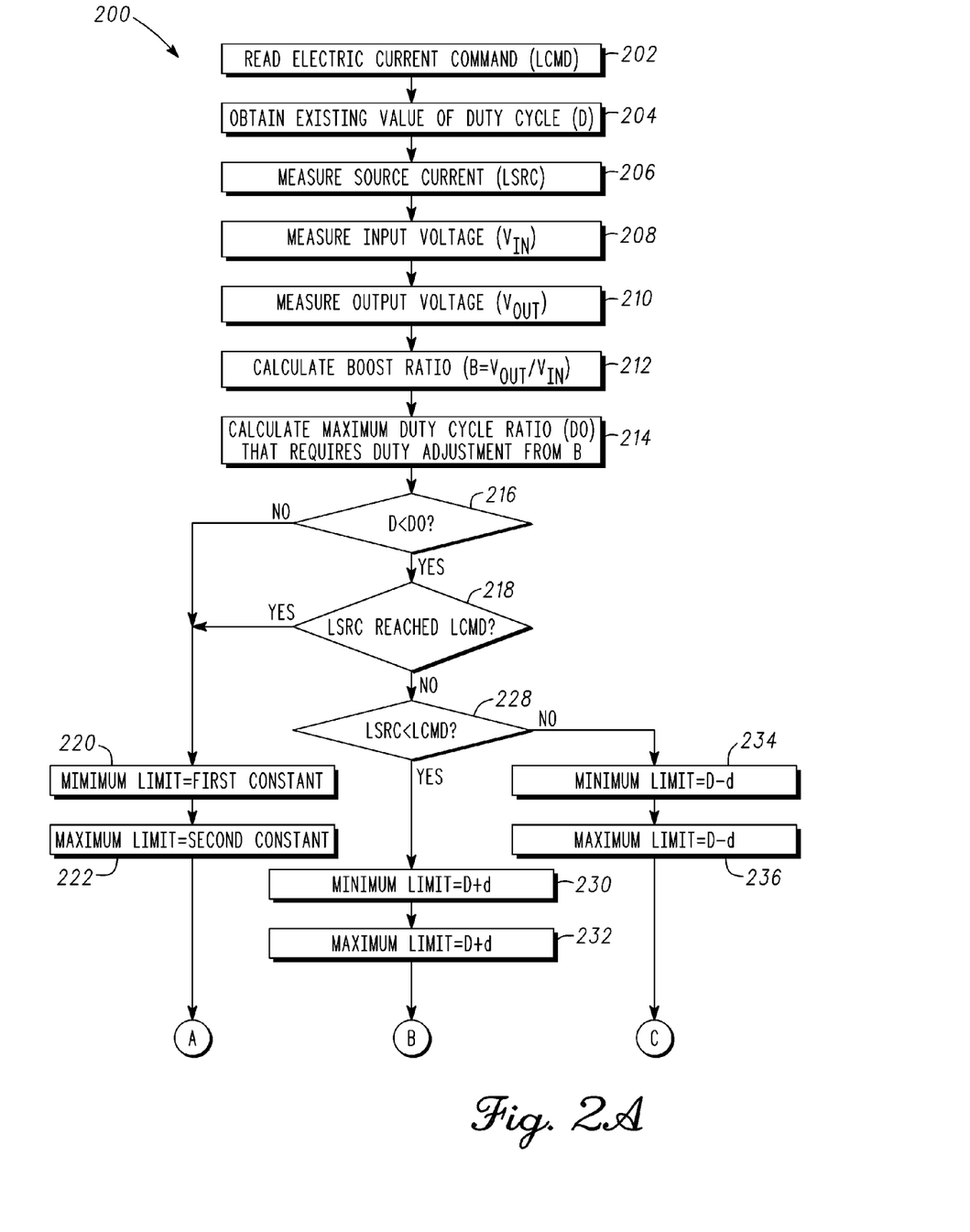
FIG. 2 is a flowchart of a process for controlling a boost converter, and that can be used in connection with the control system and the boost converter of FIG. 1, in accordance with an exemplary embodiment.
Figure 2B:
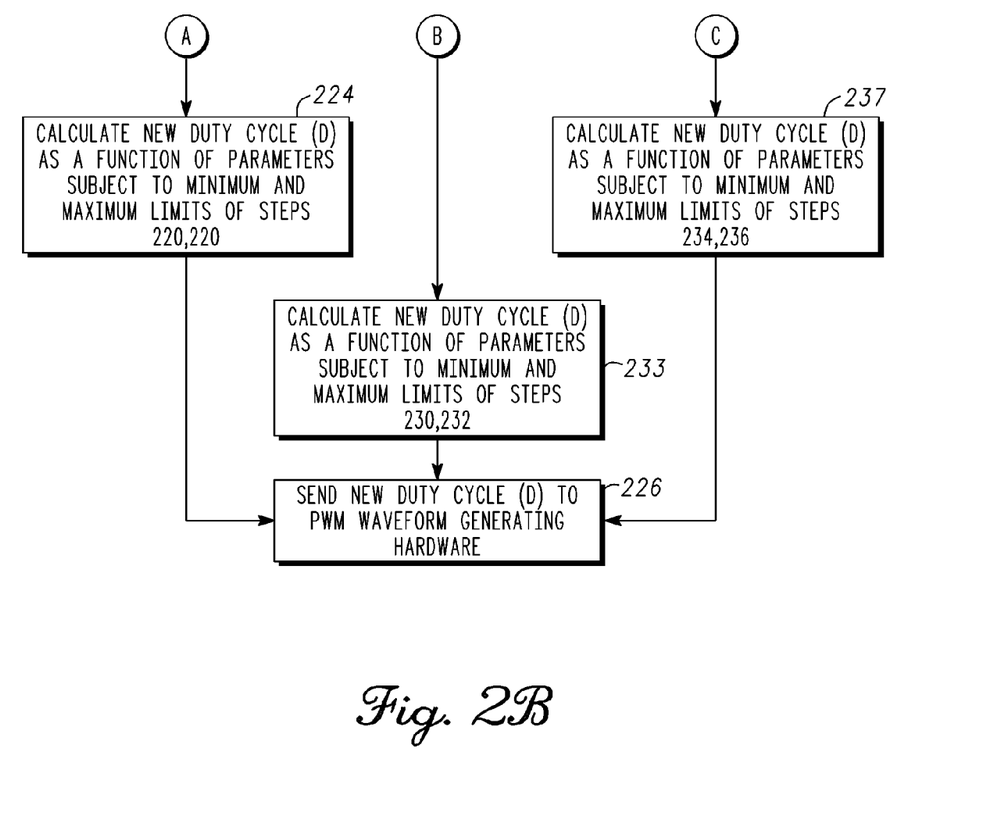

FIG. 2 is a flowchart of a process 200 for controlling a boost converter of an electric system, in accordance with an exemplary embodiment. The process 200 can be used in connection with the control system 100 and the boost converter 102 of FIG. 1, also in accordance with an exemplary embodiment.

The process 200 begins with the step of reading or receiving an electric current command (LCMD) (step 202). In a preferred embodiment, the electric current command comprises a desired amount of electric current for an electric system to be achieved by the boost converter. Also in a preferred embodiment, the electric current command is read or received from a command source, such as a human being, another control system, and/or another device and/or system. In addition, in a preferred embodiment, the electric current command pertains to the boost converter 102 of FIG. 1, and is provided from the command source to the processor 118 of FIG. 1 by the communication hardware 110 of FIG. 1.

In addition, an existing value of duty cycle (D) is obtained (step 204). In a preferred embodiment, the existing value of the duty cycle comprises a simultaneous or most recent value of a duty cycle of the transistor 106 of FIG. 1. Also in a preferred embodiment, the existing value of the duty cycle is obtained by the processor 118 of FIG. 1 from the boost converter 102 of FIG. 1.

In addition, a source current (LSRC) for the boost converter is measured (step 206). In a preferred embodiment, the source current represents a simultaneous or most recent value of the electric source current of the inductor 104 of FIG. 1. Also in a preferred embodiment, the source current is measured by the one or more electric current sensors 112 of FIG. 1 and provided to the processor 118 of FIG. 1.

An input voltage ($V_{IN}$) for the boost converter is also measured (step 208). In a preferred embodiment, the input voltage represents a simultaneous or most recent value of the input voltage of the capacitor 108 of FIG. 1. Also in a preferred embodiment, the source current is measured by the one or more first voltage sensors 114 of FIG. 1 and provided to the processor 118 of FIG. 1.

In addition, an output voltage ($V_{OUT}$) for the boost converter is also measured (step 210). In a preferred embodiment, the output voltage represents a simultaneous or most recent value of the output voltage of the capacitor 108 of FIG. 1. Also in a preferred embodiment, the source current is measured by the one or more first voltage sensors 114 of FIG. 1 and provided to the processor 118 of FIG. 1.

A boost ratio for the boost converter is then calculated (step 212). In a preferred embodiment, the boost ratio is calculated using the input voltage of step 208 and the output voltage of step 210, in accordance with the following equation:

$$\text{Boost Ratio} = (\text{Output Voltage})/(\text{Input Voltage}) \quad \text{(Equation 1)}$$

Also in a preferred embodiment, the boost ratio is calculated by the processor 118 of FIG. 1.

In addition, a maximum duty cycle ratio (D0) is calculated (step 214). In a preferred embodiment, the maximum duty cycle ratio (D0) comprises a maximum value of the duty cycle that requires a rapid adjustment above a predetermined threshold rate (e.g., fifty percent, in one exemplary embodiment) for a particular boost ratio. In a preferred embodiment, this calculation is performed by the processor 118 of FIG. 1.

Next, determinations are made in step 216 and step 218 whether a rapid adjustment of the existing value of the duty cycle (D) of step 204 above a predetermined threshold rate (e.g., fifty percent, in one exemplary embodiment) for a particular boost ratio. In a preferred embodiment, during step 216, a determination is made as to whether the existing value of the duty cycle (D) of step 204 is less than the maximum duty cycle ratio (D0) of step 214.

If a determination is made in step 216 that the existing value of the duty cycle (D) of step 204 is greater than or equal to the maximum duty cycle ratio (D0) of step 214, then the process proceeds to step 220. During step 220, a first minimum limit is set for the duty cycle of the boost converter. In a preferred embodiment, the first minimum limit of step 220 is equal to a first constant, as depicted in FIG. 2. Also in a preferred embodiment, during step 220 the first minimum limit is set for the duty cycle of the transistor 106 of the boost converter 102 of FIG. 1 by the control system 100 of FIG. 1, most preferably by the processor 118 thereof. Also in a preferred embodiment, the first minimum limit of step 220 comprises a minimum value for the duty cycle under ordinary conditions in which the duty cycle does not need to be rapidly increased or decreased in order to boost the source current to be equal to the electric current command. In addition, in a preferred embodiment, the first minimum limit of step 220 is equal to a constant value that is independent of the current value of the duty cycle. In one such exemplary embodiment, the first minimum limit of step 220 is equal to 0.10, representing a ten percent duty ratio of the transistor 106 of FIG. 1. However, this may vary in other embodiments.

In addition, during step 222, a first maximum limit is set for the duty cycle of the boost converter. In a preferred embodiment, the first maximum limit of step 222 is equal to a second constant, as depicted in FIG. 2. Also in a preferred embodiment, during step 222 the first maximum limit is set for the duty cycle of the transistor 106 of the boost converter 102 of FIG. 1 by the control system 100 of FIG. 1, most preferably by the processor 118 thereof Also in a preferred embodiment, the first maximum limit of step 222 comprises a maximum value for the duty cycle under ordinary conditions in which the duty cycle does not need to be rapidly increased or decreased in order to boost the source current to be equal to the electric current command. In addition, in a preferred embodiment, the first maximum limit of step 222 is equal to a constant value that is independent of the current value of the duty cycle. In one such exemplary embodiment, the first maximum limit of step 222 is equal to 0.90, representing a ninety percent duty ratio of the transistor 106 of FIG. 1. However, this may vary in other embodiments.

Next, the duty cycle of the boost converter is controlled using the first minimum limit and the first maximum limit of step 220 and step 222, respectively (step 224). Specifically, in a preferred embodiment depicted in FIG. 2, a new duty cycle value (D) is calculated for a new existing value of the duty cycle by the control system 100 of FIG. 1 (most preferably by the processor 118 thereof of FIG. 1) that controls the measured source current to match the electric current command and limits the output value (D) with limiting values of the first minimum limit and the first maximum limit of steps 220 and 222, respectively. Also in a preferred embodiment, the duty cycle is controlled during step 224 as a function of the electric current command of step 202, the source current of step 206, and the boost ratio of step 212 subject to the first minimum limit of step 220 and the first maximum limit of step 222.

For example, in one such exemplary embodiment, during step 224 a nominal value of the duty cycle is calculated by the processor 118 of FIG. 1 as a function of electric current command of step 202, the source current of step 206, and the boost ratio of step 212 so that the source current will match the electric current command. If the nominal value of the duty cycle is less than the first minimum limit of step 220, then the duty cycle is set equal to the first minimum level during step 224. If the nominal value is greater than the first maximum limit of step 222, then the duty cycle is set equal to the first maximum level during step 224. Conversely, if the nominal value is between the first minimum value and the first maximum value, inclusive, then the duty cycle is set equal to the nominal value during step 224.

A new duty cycle value (D) is then sent to waveform generating hardware (preferably part of the communication hardware 110 of FIG. 1) for use in controlling the duty cycle (step 226). In one exemplary embodiment, following step 226, the process returns to step 202. In this exemplary embodiment, provided that a rapid increase of the duty cycle is not required (i.e., in the depicted embodiment, if the existing value of the duty cycle D is greater than or equal to the maximum value D0, or if the source current has reached the electric current command, or both), steps 202-226 continue to repeat, preferably continuously, as the duty cycle for the boost converter is controlled as a function of the electric current command, the source current, and the boost ratio, subject to the first minimum limit of step 220 and the first maximum limit of step 222. In other embodiments, this processing is done as an interrupt service routine, so that the processor 118 of FIG. 1 exits following step 226 and begins executing step 202 when the next interrupt occurs.

Returning now to step 216, if it is determined in step 216 that the existing value of the duty cycle (D) of step 204 is less than the maximum duty cycle ratio (D0) of step 214, then the process proceeds instead to step 218. During step 218, a determination is made as to whether the source current has reached the electric current command. In one preferred embodiment, this determination comprises a determination as to whether the source current and the electric current command are within a predetermined threshold (e.g., ten percent, in one exemplary embodiment) apart from one another. Also in a preferred embodiment, this determination is made by the processor 118 of FIG. 1.

If it is determined in step 218 that the source current has reached the electric current command (that is, in one preferred embodiment, that the source current and the electric current command are within the predetermined threshold apart from one another, then the process returns to the above-referenced step 220. Accordingly, in one preferred embodiment, the process proceeds to step 220 if either the existing value of the duty cycle (D) is greater than or equal to the maximum value (D0) or the current has reached the electric current command. Otherwise, the process proceeds instead step 228, discussed further below. In other exemplary embodiments, the process may proceed to step 220 based on the outcome of step 216 or step 218 alone (e.g., if either the existing value of the duty cycle (D) is greater than or equal to the maximum value (D0), irrespective of whether the current has reached the electric current command, or vice versa, and the process may otherwise proceed to step 228. In yet another exemplary embodiment, the process may proceed to step 220 if one or more other requirements are met that would suggest that a rapid change in duty cycle is required, such as if the source current is less than a predetermined threshold, among other possible conditions in various other embodiments, with the process proceeding to step 228 if such one or more other requirements are not met.

Returning now to step 218, if it is determined in step 218 that the source current has not reached the electric current command (that is, in one preferred embodiment, that the source current and the electric current command are not within the predetermined threshold apart from one another, then the process proceeds to step 228. During step 228, the source current of step 206 is compared with the electric current command of step 202, and a determination is made as to whether the source current is less than the electric current command. Also in a preferred embodiment, this determination is made by the processor 118 of FIG. 1.

If it is determined in step 228 that the source current is less than the electric current command, then the process proceeds to step 230. During step 230, a second minimum limit is set for the duty cycle of the boost converter. In a preferred embodiment, during step 230 the second minimum limit is set for the duty cycle of the transistor 106 of the boost converter 102 of FIG. 1 by the control system 100 of FIG. 1, most preferably by the processor 118 thereof. Also in a preferred embodiment, the second minimum limit of step 230 comprises a minimum value for the duty cycle under conditions in which it is desirable to rapidly increase the duty cycle in order to boost the source current to be equal to the electric current command.

In addition, in a preferred embodiment, the second minimum limit of step 230 is dependent upon the current value of the duty cycle. In one such exemplary embodiment, as depicted in FIG. 2, the second minimum limit of step 230 is calculated in accordance with the following equation:

$$\text{Second Minimum Limit} = \text{Existing Value of Duty Cycle} + d \quad \text{(Equation 2)},$$

in which "d" is preferably equal to a constant value. In one preferred embodiment, "d" is equal to a constant value of 0.05, or five percent. However, this may vary in other embodiments.

In addition, during step 232, a second maximum limit is set for the duty cycle of the boost converter. In a preferred embodiment, during step 232, the second maximum limit is set for the duty cycle of the transistor 106 of the boost converter 102 of FIG. 1 by the control system 100 of FIG. 1, most preferably by the processor 118 thereof. Also in a preferred embodiment, the second maximum limit of step 232 comprises a maximum value for the duty cycle under conditions in which it is desirable to rapidly increase the duty cycle in order to boost the source current to be equal to the electric current command.

In addition, in a preferred embodiment, the second maximum limit of step 232 is dependent upon the current value of the duty cycle. In one such exemplary embodiment, depicted in FIG. 2, the second maximum limit of step 232 is calculated in accordance with the following equation:

$$\text{Second Maximum Limit} = \text{Existing Value of Duty Cycle} + d \quad \text{(Equation 3)},$$

in which "d" is preferably equal to a constant value. In one preferred embodiment, "d" is equal to a constant value of 0.05, or five percent. However, this may vary in other embodiments.

As shown in Equations 2 and 3 and the discussion above, in one preferred embodiment the second minimum limit of step 230 and the second maximum limit of step 232 are set equal to one another. This has the effect of forcing the duty cycle to a particular value in a rapid manner, to thereby increase the source current rapidly until it equals the electric current command. However, this may also vary in other embodiments.

Next, the duty cycle of the boost converter is controlled using the second minimum limit and the second maximum limit of step 230 and step 232, respectively (step 233). During step 233, the duty cycle of the boost converter is controlled using the second minimum limit and the second maximum limit of step 230 and step 232, respectively. Specifically, in a preferred embodiment depicted in FIG. 2, a new duty cycle value (D) is calculated for a new existing value of the duty cycle by the control system 100 of FIG. 1 (most preferably by the processor 118 thereof of FIG. 1) that controls the measured source current to match the electric current command and limits the output value (D) with limiting values of the second minimum limit and the second maximum limit of steps 230 and 232, respectively. Also in a preferred embodiment, the duty cycle is controlled during step 233 as a function of the electric current command of step 202, the source current of step 206, and the boost ratio of step 212 subject to the second minimum limit of step 230 and the second maximum limit of step 232.

For example, in one such exemplary embodiment, during step 233, a nominal value of the duty cycle is calculated by the processor 118 of FIG. 1 as a function of electric current command of step 202, the source current of step 206, and the boost ratio of step 212 to match the source current with the electric current command and is then compared with the second minimum limit of step 230 and the second maximum limit of step 232. If the nominal value of the duty cycle is less than the second minimum limit of step 230, then the duty cycle is set equal to the second minimum level of step 230. If the nominal value is greater than the second maximum limit of step 232, then the duty cycle is set equal to the second maximum level of step 232. Conversely, if the nominal value is between the second minimum value of step 230 and the second maximum value of step 232, inclusive, then the duty cycle is set equal to the nominal value.

Following step 233, step 226 is preferably conducted, as the duty new duty cycle value (D) is then sent to waveform generating hardware (preferably part of the communication hardware 110 of FIG. 1) for use in controlling the duty cycle. In one exemplary embodiment, the process then returns to step 202, and steps 202-218, 228, 230, 232, 233, and 226 continue to repeat, most preferably continuously, so long as a rapid increase in the duty cycle is required (i.e., in the depicted embodiment, if the existing value of the duty cycle is less than the maximum value and the source current has not reached the electric current command) and the source current is less than the electric current command. Also in one exemplary embodiment, during each iteration, the duty cycle is increased by the constant "d" from Equation 2 and Equation 3. For example, in one exemplary embodiment in which the constant "d" is equal to 0.05, the duty cycle is increased in five percent increments during each iteration. By way of this continued example, if the existing duty cycle is equal to 0.15 (i.e., a fifteen percent duty cycle) during a beginning of a first iteration and needs to be raised to 0.5 (i.e., a fifty percent duty cycle) in order for the source current to be increased enough to equal to the electric current command, then the duty cycle may be (i) increased to 0.20 (i.e., a duty cycle of twenty percent) during the first iteration of steps 202-218 and 226-232; (ii) increased to 0.25 (i.e., a duty cycle of twenty five percent) during a second iteration; (iii) increased to 0.30 (i.e., a duty cycle of thirty percent) during a third iteration; (iv) increased to 0.35 (i.e., a duty cycle of thirty five percent) during a fourth iteration; (v) increased to 0.40 (i.e., a duty cycle of forty percent) during a fifth iteration; (vi) increased to 0.45 (i.e., a duty cycle of forty five percent) during a sixth iteration of steps 202-218 and 226-232; and (vii) increased to the desired 0.50 value (i.e., a duty cycle of fifty percent) during a seventh iteration. As such, the duty ratio is increased to the desired level more quickly than using traditional techniques. However, this may vary in other embodiments. For example, in one alternate embodiment, duty ratio control is accomplished by incrementing or decrementing the source current command. This term is used to compute the current error, which is used to compute the duty cycle.

Returning now to step 228, if it is determined in step 228 that the source current is greater than or equal to the electric current command, then the process proceeds instead to step 234. During step 234, a different value of the second minimum limit is set for the duty cycle of the boost converter. In a preferred embodiment, during step 234 the second minimum limit is set for the duty cycle of the transistor 106 of the boost converter 102 of FIG. 1 by the control system 100 of FIG. 1, most preferably by the processor 118 thereof. Also in a preferred embodiment, the second minimum limit of step 234 comprises a minimum value for the duty cycle under conditions in which it is desirable to rapidly decrease the duty cycle in order to reduce the source current sufficiently to be equal to the electric current command.

In addition, in a preferred embodiment, the second minimum limit of step 234 is dependent upon the current value of the duty cycle. In one such exemplary embodiment depicted in FIG. 2, the second minimum limit of step 234 is calculated in accordance with the following equation:

$$\text{Second Minimum Limit} = \text{Existing Value of Duty Cycle} - d \quad \text{(Equation 4)},$$

in which "d" is preferably equal to a constant value. In one preferred embodiment, "d" is equal to a constant value of 0.05, or five percent. However, this may vary in other embodiments.

In addition, during step 236, a different value for the second maximum limit is set for the duty cycle of the boost converter. In a preferred embodiment, during step 236, the second maximum limit is set for the duty cycle of the transistor 106 of the boost converter 102 of FIG. 1 by the control system 100 of FIG. 1, most preferably by the processor 118 thereof. Also in a preferred embodiment, the second maximum limit of step 236 comprises a maximum value for the duty cycle under conditions in which it is desirable to rapidly increase the duty cycle in order to boost the source current to be equal to the electric current command.

In addition, in a preferred embodiment, the second maximum limit of step 236 is dependent upon the current value of the duty cycle. In one such exemplary embodiment depicted in FIG. 2, the second maximum limit of step 236 is calculated in accordance with the following equation:

Second Maximum Limit=Existing Value of Duty Cycle−$d$  (Equation 5), in which "d" is preferably equal to a constant value. In one preferred embodiment, "d" is equal to a constant value of 0.05, or five percent. However, this may vary in other embodiments.

As shown in Equations 4 and 5 and the discussion above, in one preferred embodiment the second minimum limit of step 234 and the second maximum limit of step 236 are set equal to one another. This has the effect of forcing the duty cycle to a particular value in a rapid manner, to thereby reduce the source current rapidly until it equals the electric current command. However, this may also vary in other embodiments. Also in the depicted embodiment, it is noted that the constant "d" is the same value for each of equations 2-5. Thus, in this preferred embodiment, the same constant value "d" that is added to the existing value of duty cycle in steps 230 and 232 is instead subtracted from the existing value of duty cycle in steps 234 and 236. However, this may also vary in other embodiments.

Next, the duty cycle of the boost converter is controlled using the second minimum limit and the second maximum limit of step 234 and step 236, respectively (step 237). During step 237, the duty cycle of the boost converter is controlled using the second minimum limit and the second maximum limit of step 234 and step 236, respectively. Specifically, in a preferred embodiment depicted in FIG. 2, a new duty cycle value (D) is calculated for a new existing value of the duty cycle by the control system 100 of FIG. 1 (most preferably by the processor 118 thereof of FIG. 1) that controls the measured source current to match the electric current command and limits the output value (D) with limiting values of the second minimum limit and the second maximum limit of steps 234 and 234, respectively. Also in a preferred embodiment, the duty cycle is controlled during step 237 as a function of the electric current command of step 202, the source current of step 206, and the boost ratio of step 212 subject to the second minimum limit of step 234 and the second maximum limit of step 236.

For example, in one such exemplary embodiment, during step 237 a nominal value of the duty cycle is calculated by the processor 118 of FIG. 1 as a function of electric current command of step 202, the source current of step 206, and the boost ratio of step 212 to match the source current with the electric current command and is then compared with the second minimum limit of step 234 and the second maximum limit of step 236. If the nominal value of the duty cycle is less than the second minimum limit of step 234, then the duty cycle is set equal to the second minimum level of step 234. If the nominal value is greater than the second maximum limit of step 236, then the duty cycle is set equal to the second maximum level of step 236. Conversely, if the nominal value is between the second minimum value of step 234 and the second maximum value of step 236, inclusive, then the duty cycle is set equal to the nominal value.

Following step 237, step 226 is preferably conducted, as the duty new duty cycle value (D) is then sent to waveform generating hardware (preferably part of the communication hardware 110 of FIG. 1) for use in controlling the duty cycle. In one exemplary embodiment, following step 226, the process then returns to step 202, and steps 202-218, 228, 234, 236, 237, and 226 preferably continue to repeat, most preferably continuously, so long as a rapid increase in the duty cycle is required (i.e., in the depicted embodiment, if the existing value of the duty cycle is less than the maximum value and the source current has not reached the electric current command) and the source current is greater than or equal to the electric current command.

Also in one exemplary embodiment, during each iteration of steps 202-218, 228, 234, 236, 237, and 226, the duty cycle is decreased by the constant "d" from Equation 4 and Equation 5. For example, in one exemplary embodiment in which the constant "d" is equal to 0.05, the duty cycle is decreased in five percent increments during each iteration. By way of this continued example, if the existing duty cycle is equal to 0.50 (i.e., a fifty percent duty cycle) during a beginning of a first iteration and needs to be decreased to 0.15 (i.e., a fifteen percent duty cycle) in order for the source current to be decreased enough to equal to the electric current command, then the duty cycle may be (i) decreased to 0.45 (i.e., a duty cycle of forty five percent) during the first iteration; (ii) decreased to 0.40 (i.e., a duty cycle of forty percent) during a second iteration; (iii) decreased to 0.35 (i.e., a duty cycle of thirty five percent) during a third iteration; (iv) decreased to 0.30 (i.e., a duty cycle of thirty percent) during a fourth iteration; (v) decreased to 0.25 (i.e., a duty cycle of twenty five percent) during a fifth iteration; (vi) decreased to 0.20 (i.e., a duty cycle of twenty percent) during a sixth iteration of steps 202-218, 226, and 234-238; and (vii) decreased to the desired 0.15 value (i.e., a duty cycle of fifteen percent) during a seventh iteration. As such, the duty ratio is decreased to the desired level more quickly than using traditional techniques. However, this may vary in other embodiments. For example, in one alternate embodiment, duty ratio control is accomplished by incrementing or decrementing the source current command. This term is used to compute the current error, which is used to compute the duty cycle.

In one exemplary embodiment, the steps of the process 200 repeat, most preferably continuously, until the source current is equal to the electric current command. The process 200 allows a more rapid movement of the duty cycle to the desired level, thereby resulting in a more rapid increase or decrease in the source current to become equal to the source current command, during conditions in which such more rapid movement is desired. This allows boost converter adjustment delays to be minimized or reduced under such conditions.

It will be appreciated that the disclosed method and systems may vary from those depicted in the Figures and described herein. For example, as mentioned above, certain elements of the control system 100 (such as the number of and/or configuration of the communication hardware 110, electric current sensors 112, first voltage sensors 114, and/or second voltage sensors 116 thereof), and/or the boost converter 102 of FIG. 1, one or more other components, and/or portions thereof, may vary, and/or may be part of and/or coupled to one another and/or to one or more other systems and/or devices. In addition, it will be appreciated that certain steps of the process 200 may vary from those depicted in FIG. 2 and/or described herein in connection therewith, and/or may be performed simultaneously and/or in a different order than that depicted in FIG. 2 and/or described herein in connection therewith. It will similarly be appreciated that the disclosed methods and systems may be implemented and/or utilized in connection with various different types of electric systems, such as those in automobiles, vehicles and/or other devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling a boost converter having a duty cycle, the method comprising the steps of:
obtaining a boost ratio of the boost converter;
obtaining an existing value of the duty cycle;
receiving an electric current command for the boost converter;
measuring a source current for the boost converter; and
regulating the duty cycle as a function of the electric current command, the boost ratio, and the source current, subject to:
a first minimum limit and a first maximum limit if the existing value of the duty cycle is greater than or equal to a first predetermined threshold, the electric current command and the source current are less than a second predetermined threshold apart, or both; and
a second minimum limit and a second maximum limit if the existing value of the duty cycle is less than the first predetermined threshold and the electric current command and the source current are at least the second predetermined threshold apart.

2. The method of claim 1, further comprising the steps of:
calculating an input voltage of the boost converter; and
calculating an output voltage of the boost converter;
wherein the step of obtaining the boost ratio comprises the step of obtaining the boost ratio of the boost converter using the input voltage and the output voltage of the boost converter.

3. The method of claim 1, further comprising the step of:
calculating a maximum duty cycle that requires duty adjustment given the boost ratio, to thereby obtain the second predetermined threshold.

4. The method of claim 1, further comprising the step of:
obtaining an existing value of the duty cycle;
wherein the step of regulating the duty cycle comprises the step of regulating the duty cycle as the function of the electric current command, the source current, and the boost ratio, subject to:
the first minimum limit and the first maximum limit if the existing value of the duty cycle is greater than or equal to a second predetermined threshold; and
the second minimum limit and the second maximum if the existing value of the duty cycle is less than the second predetermined threshold.

5. The method of claim 1, further comprising the step of:
obtaining an existing value of the duty cycle, wherein:
the first minimum and maximum limits are independent of the existing value of the duty cycle; and
the second minimum and maximum limits are dependent upon the existing value of the duty cycle.

6. The method of claim 5, wherein the second minimum limit is equal to the second maximum limit.

7. The method of claim 6, further comprising the steps of:
adding a first predetermined value to the existing value of the duty cycle, to thereby calculate the second minimum limit and the second maximum limit, if the rapid change in duty cycle is required above the predetermined threshold; and
subtracting a second predetermined value from the existing value of the duty cycle, to thereby calculate the second minimum limit and the second maximum limit, if the rapid change in duty cycle is not required.

8. A method for controlling a boost converter having a duty cycle, the method comprising the steps of:
receiving an electric current command for the boost converter;
measuring a source current for the boost converter;
determining a boost ratio for the boost converter;
determining an existing value of the duty cycle;
regulating the duty cycle as a function of the electric current command, the source current, and the boost ratio if the existing value of the duty cycle is greater than or equal to a first predetermined value, a difference between the electric current command and the source current is less than a second predetermined value, or both;
forcing the duty cycle to a first fixed value if the existing value of the duty cycle is greater than or equal to a first predetermined value, the difference between the electric current command and the source current is less than the second predetermined value, or both; and
forcing the duty cycle to a second fixed value if the existing value of the duty cycle is less than the first predetermined value, the difference between the electric current command and the source current is greater than or equal to the second predetermined value, and the source current is greater than or equal to the electric current command, the second fixed value being equal to the existing value of the duty cycle minus the constant, wherein:
the first fixed value is equal to the existing value of the duty cycle plus a first constant; and
the second fixed value is equal to the existing value of the duty cycle minus a second constant.

9. The method of claim 8, wherein the first constant is equal to the second constant.

10. A system for controlling a boost converter having a duty cycle, the system comprising:
a first sensor configured to measure a source current of the boost converter;
a second sensor configured to measure an input voltage of the boost converter;
a third sensor configured to measure an output voltage of the boost converter; and
a processor coupled to the first sensor, the second sensor, and the third sensor and configured to:
receive an electric current command;
obtain an existing value of the duty cycle;
calculate a boost ratio using the input voltage and the output voltage; and
regulate the duty cycle as a function of the electric current command, the boost ratio, and the source current, subject to:
a first minimum limit and a first maximum limit if the existing value of the duty cycle is greater than or equal to a first predetermined threshold, the electric current command and the source current are less than a second predetermined threshold apart, or both; and a second minimum limit and a second maximum limit if the existing value of the duty cycle is less than the first predetermined threshold and the electric current command and the source current are at least the second predetermined threshold apart.

11. The system of claim 10, wherein the processor is further configured to calculate a maximum duty cycle that requires duty adjustment given the boost ratio, to thereby obtain the second predetermined threshold.

12. The system of claim 10, wherein:
the first minimum and maximum limits are independent of the existing value of the duty cycle; and
the second minimum and maximum limits are dependent upon the existing value of the duty cycle.

13. The system of claim 10, wherein the second minimum limit is equal to the second maximum limit.

14. The system of claim 10, wherein the processor is further configured to:
add a first predetermined value to the existing value of the duty cycle, to thereby calculate the second minimum limit and the second maximum limit, if the rapid change in duty cycle is required above the predetermined threshold; and
subtract a second predetermined value from the existing value of the duty cycle, to thereby calculate the second minimum limit and the second maximum limit, if the rapid change in duty cycle is not required.

15. A system for controlling a boost converter having a duty cycle, the system comprising:
a first sensor configured to measure a source current of the boost converter;
a second sensor configured to measure an input voltage of the boost converter;
a third sensor configured to measure an output voltage of the boost converter; and
a processor coupled to the first sensor, the second sensor, and the third sensor and configured to:
receive an electric current command;
obtain an existing value of the duty cycle;
calculate a boost ratio using the input voltage and the output voltage; and
regulate the duty cycle as a function of the electric current command, the boost ratio, and the source current, subject to:
a first minimum limit and a first maximum limit if a rapid change in duty cycle is required above a predetermined threshold; and
a second minimum limit and a second maximum limit if the rapid change in duty cycle is not required,
wherein:
the first minimum and maximum limits are independent of the existing value of the duty cycle; and
the second minimum and maximum limits are dependent upon the existing value of the duty cycle.

16. A system for controlling a boost converter having a duty cycle, the system comprising:
a first sensor configured to measure a source current of the boost converter;
a second sensor configured to measure an input voltage of the boost converter;
a third sensor configured to measure an output voltage of the boost converter; and
a processor coupled to the first sensor, the second sensor, and the third sensor and configured to:
receive an electric current command;
calculate a boost ratio using the input voltage and the output voltage; and
regulate the duty cycle as a function of the electric current command, the boost ratio, and the source current, subject to:
a first minimum limit and a first maximum limit if a rapid change in duty cycle is required above a predetermined threshold; and
a second minimum limit and a second maximum limit if the rapid change in duty cycle is not required;
wherein the second minimum limit is equal to the second maximum limit.

* * * * *